No. 888,259. PATENTED MAY 19, 1908.
C. PAUTHONIER.
APPARATUS FOR FILTERING LIQUIDS.
APPLICATION FILED SEPT. 25, 1906.

2 SHEETS—SHEET 1.

WITNESSES
Frank H Logan

INVENTOR,
CASIMIR PAUTHONIER
BY
ATTORNEY

No. 888,259. PATENTED MAY 19, 1908.
C. PAUTHONIER.
APPARATUS FOR FILTERING LIQUIDS.
APPLICATION FILED SEPT. 25, 1906.

2 SHEETS—SHEET 2.

WITNESSES
Frank H. Logan
Jhn H. Foring

INVENTOR,
CASIMIR PAUTHONIER
BY
Berrigan
ATTORNEY.

UNITED STATES PATENT OFFICE.

CASIMIR PAUTHONIER, OF ANGY, FRANCE.

APPARATUS FOR FILTERING LIQUIDS.

No. 888,259.  Specification of Letters Patent.  Patented May 19, 1908.

Application filed September 25, 1906. Serial No. 336,177.

*To all whom it may concern:*

Be it known that I, CASIMIR PAUTHONIER, a citizen of the Republic of France, and resident of Angy, Oise, France, have invented a new and useful Apparatus for Filtering Liquids, which apparatus is fully set forth in the following specification.

This invention relates to an apparatus for filtering and discharging liquids, and employs filtering casings of materials generally recognized as useful for this purpose, and principally hollow rods or cylinders called "Pasteur bougie".

To allow complete emptying of the receptacle containing it, the bougie has been, according to my invention, inclosed in a shell. This arrangement insures complete emptying of the receptacle, without turning the vessel over and, if necessary, without touching it.

Figure 1:
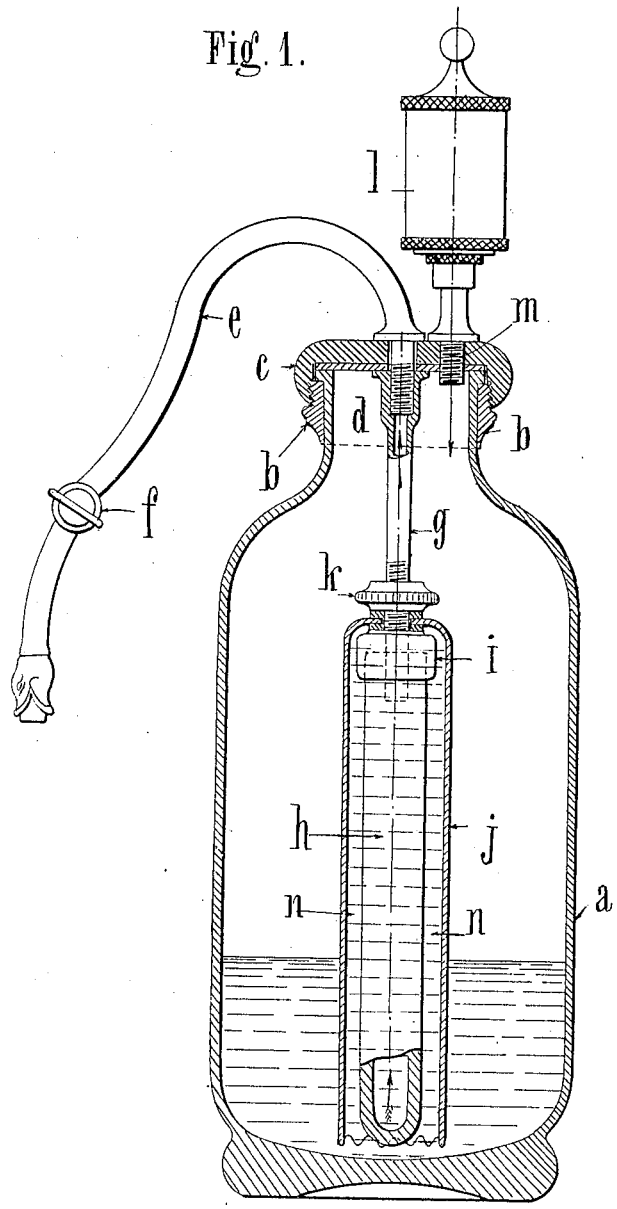
Figure 2:
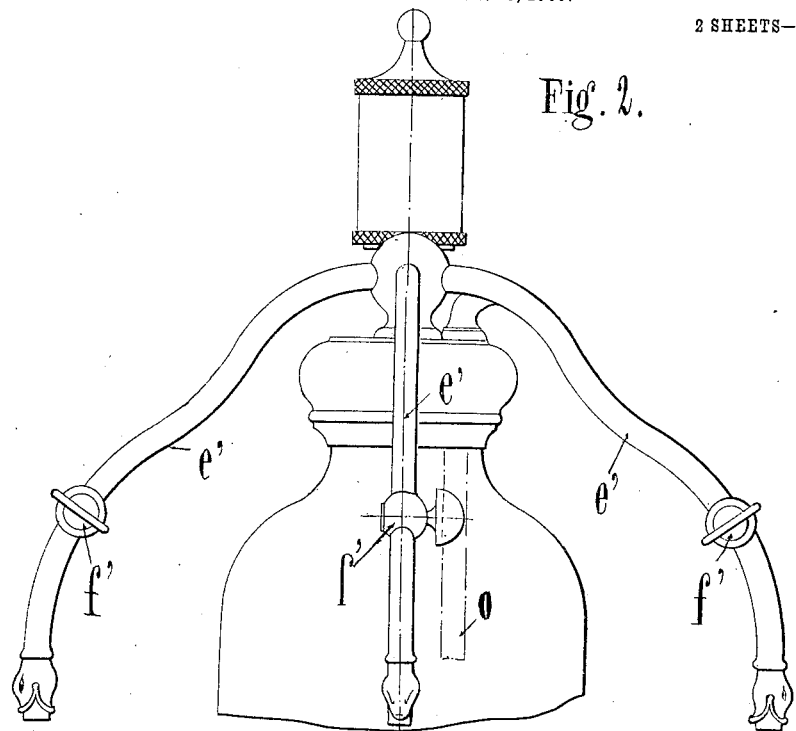
Figure 3:
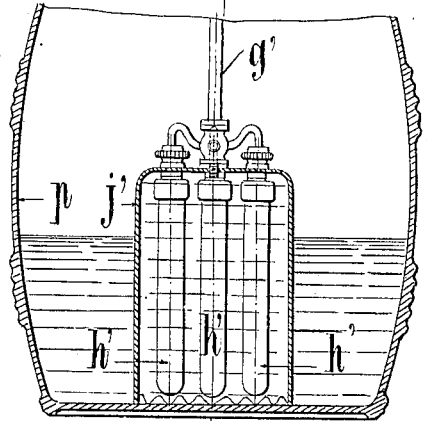
Figure 4:
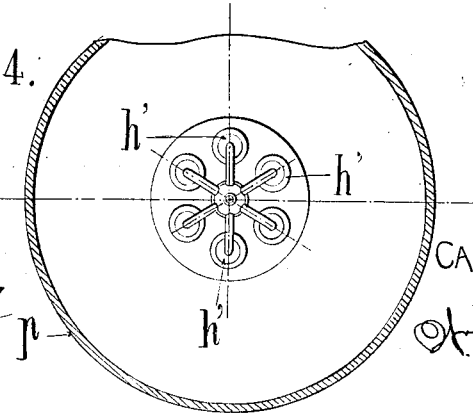

Figure 1 is a vertical section of a table apparatus embodying my invention; Fig. 2 shows the upper part of an apparatus having, in addition to a plurality of discharge pipes for the filtered water, a pipe for the discharge of non-filtered water; Fig. 3 illustrates a vertical section of the lower part of an apparatus employing a plurality of filtering casings or bougies connected to a single discharge pipe; Fig. 4 is a top view of Fig. 3.

In the table apparatus (Fig. 1), $a$ designates the water receptacle. While any form, size and capacity may be used, I have shown the well-known form of seltzer water siphons which, for practical uses, and ease of transportation, is useful. The vessel $a$ carries at its upper part a ring $b$, of suitable material, consisting of two screw-threaded pieces, on which a cap $c$ is screwed. The bottom of this cap is provided with a washer $d$ made of rubber, leather or cork, on which the edges of the vessel, being perfectly fitted, press so as to effect a tight closure, to maintain pressure as hereinafter described, which closure is obtained by tightening the cap on the ring, the latter being fastened on the neck of the vessel by sealing or any other suitable manner.

The cap $c$ carries a tube $e$, of suitable material, bent over at the outer end and is provided with a cock $f$ intended to maintain the pressure and to regulate the flow of the liquid, making it unnecessary to pump each time that the apparatus is used. The part of the tube $e$, which passes through the cap is screw-threaded, and on its screw-threaded part is secured the head of a discharge tube $g$, of suitable material, which not only enters but serves as support for the filter.

$h$ is a filtering bougie, made of any desired material which does not have any influence on the taste of the liquid, such as biscuit-baked porcelain, pressed charcoal or asbestos porcelain or asbestos carbon (made by introducing pulverized asbestos in the porcelain or in the carbon before baking). The filter is not only a mechanical filter, but also a chemical filter, as the purifying action of carbon, when used, is well known.

The size of the casing $h$ is in proportion to the capacity of the vessel so as to obtain a sufficient filtering surface to allow a rapid flow as well as a perfect filtration. The upper end of the casing is provided with a part $i$, of suitable material, to which it is sealed, and arranged so as to adapt itself to the tube $e$. All parts in contact with the liquid, are made up to meet the strictest requirement of hygiene.

The filter rod or casing $h$ is surrounded by a jacket or shell $j$ made of glass or porcelain or other suitable material. The upper part of said shell is closed or has a flat bottom, in the center of which is a hole for the passage of the tube $g$ which is screw-threaded on a fairly large part of its length, in order to allow the regulation of the level of the filter in the vessel $a$. The lower part of the jacket or bell $j$ is open and preferably provided with serrations so as to allow the liquid to pass in case that the lower end should touch the bottom of the vessel. The shell or bell $j$ is kept in place by a suitable device which can be easily unmounted so as to enable easy cleaning of all parts of the apparatus.

The cap $c$ is provided with a small forcing pump $l$, which may be similar to those used for inflating bicycle tires but of smaller capacity. This pump $l$ is provided at its lower end with a pipe $m$ containing a valve (intended for the maintenance of the pressure) which fits on the cap $c$ and remains there permanently, so that, when pressure in receptacle $a$ is exhausted, no adjusting is necessary to renew the pressure. Under these conditions, when the apparatus contains a quantity of some liquid, if the pump $l$ is operated, the air will be compressed above the liquid, and the pressure will cause the liquid to rise into the space $n$ $n$ separating the inner wall of the bell or jacket $j$ and the outer wall of the cylinder. At first, a little air is compressed in that space, but if the cock $f$ is left open, this air is quickly expelled to the outside and the filter will readily take water and fill. Thereafter, the vessel will empty entirely until the level has attained the lower edge of the jacket or shell. The pressure forces the liquid to pass through the walls of the filtering casing $h$ on all its surface (which is relatively large in relation to the capacity of the vessel), the flow becomes rapid and the filtering as perfect as possible. It is obvious that upon increasing the pressure the flow will be increased. This arrangement enables the vessel to be completely emptied, as the pressure acts only on the surface of the liquid exterior of jacket or shell $j$, and the liquid will always rise within said shell so that the filter will be always entirely immersed, whatever the level of the liquid in the receptacle may be. The cleaning, which must be done frequently, must also be very easy in order that the apparatus should fulfil in a perfect manner its hygienic purpose and be practical. To this end, it is sufficient to unscrew the nut $k$ to separate the casing $h$ from the jacket, and to remove the deposits, to rinse the casing, and to put it back in place. The receptacle is rinsed the same as any ordinary bottle and with the same facility.

It is advisable that while, in practice, the receptacle may be of any desired capacity, the filters and caps should best be of constant dimensions. In that case all parts are interchangeable so that any part can be replaced or repaired with greatest ease, and at a minimum of expense. For table vessels of larger dimensions, the apparatus can be provided with several discharge pipes $e^1$ (Fig. 2), arranged on the same filter, each of said pipes having a cock $f^1$, so that several persons can simultaneously use the apparatus without inconvenience and without the necessity of moving it out of place. The apparatus may also be provided with two pipes, one ($g$) being in communication with the filter, and the other (in dotted lines at $o$, Fig. 2) plunging directly into the liquid of the vessel outside the filter. Thus, owing to this arrangement, filtered or unfiltered water can be drawn from the same apparatus simultaneously or successively.

The apparatus may be a cask $p$ shown in Fig. 3 in vertical section and in Fig. 4 horizontal section, preferably made of glass and of suitable capacity. Several cylinders $h^1$ are connected, in battery fashion, within the same jacket or bell $j^1$, and these cylinders are in communication, by branch pipes, with a single discharge pipe $g$, provided with a cock. The forcing pump connected to the apparatus is of suitable size and the quantity of water necessary for the use of the kitchen and toilet is thus obtained under the desired hygienic conditions.

Where a house is to be served, the receptacle may be of wood, metal or other suitable material, and of a capacity to meet the requirements. It is sufficient to multiply the number of filtering cylinders and to increase their dimensions, in order to obtain the necessary quantity of filtered water. The pump may be sufficiently powerful to make the water rise to all stories of the house. Except in the case of an apparatus for a house, all parts of the apparatus are, as has been shown, carried by or integral with the stopper or cap which allows to apply the system to any bottle.

I claim:

1. In a portable apparatus for effecting filtration and discharge of liquid irrespective of the height of liquid within a vessel, a portable water-storage vessel, an air-compressing device portable with said vessel for exerting pressure as desired upon liquid therein, a filtering device comprising a hollow filtering casing having an extensive filtering surface, a discharge pipe from said filtering device and a non-filtering shell surrounding and separated from said casing and extending nearly to the bottom of the vessel, said shell being closed at its upper end and open at its lower end.

2. In a portable apparatus for effecting filtration and discharge of liquid irrespective of the height of liquid within a vessel, a portable water-storage vessel, an air-compressing device portable with said vessel for exerting pressure as desired upon liquid therein, a plurality of filtering devices comprising a group of hollow filtering casings each having an extensive filtering surface, a discharge pipe connected with the interior of each of said casings, and a non-filtering shell surrounding and separated from the group of casings and extending nearly to the bottom of the vessel, said shell being closed at its upper end and open at its lower end.

3. In a portable apparatus for effecting discharge of liquid in either filtered or unfiltered state from a vessel, a portable water-storage vessel, an air-compressing device portable with said vessel for exerting pressure as desired upon liquid therein, a pipe dipping directly into said liquid and discharging outside of said vessel, a filtering device comprising a hollow filtering casing having an extensive filtering surface, a discharge pipe from said filtering device, and a non-filtering shell surrounding and separated from said casing and extending nearly to the bottom of the vessel, said shell being closed at its upper end and open at its lower end.

In testimony whereof I have signed this specification in the presence of two subscribing witnesses.

CASIMIR PAUTHONIER.

Witnesses:
JOSEPH LE DUC,
CHARLES DITAL.